United States Patent [19]

Hastings et al.

[11] Patent Number: 5,388,792
[45] Date of Patent: Feb. 14, 1995

[54] PIVOTABLE COMPUTER TOWER SUPPORT FOOT APPARATUS

[75] Inventors: Robert J. Hastings, Kingwood; Paily T. Varghese, Tomball, both of Tex.

[73] Assignee: Compaq Computer Corporation, Houston, Tex.

[21] Appl. No.: 118,938

[22] Filed: Sep. 9, 1993

[51] Int. Cl.6 .............................................. F16M 11/20
[52] U.S. Cl. .............................. 248/188.1; 248/188.8; 248/222.1; 248/346
[58] Field of Search ............... 248/188.1, 188, 188.8, 248/678, 677, 346, 349, 919, 222.3, 222.1; 220/629, 630; 312/351.3, 351.9

[56] References Cited

U.S. PATENT DOCUMENTS

| | | | |
|---|---|---|---|
| D. 313,015 | 12/1990 | Ryan et al. | D14/100 |
| 2,607,649 | 8/1952 | Johnson | 312/20 |
| 3,401,908 | 9/1968 | Rapata | 248/188.8 |
| 3,587,453 | 6/1971 | Klein et al. | 101/1 |
| 3,908,942 | 9/1975 | Keith et al. | 248/158 |
| 4,542,872 | 9/1985 | Marino et al. | 248/183 |
| 4,635,811 | 1/1987 | Lodi | 220/69 |
| 4,776,553 | 10/1988 | Kobayashi | 248/558 |
| 4,872,733 | 10/1989 | Tedham et al. | 312/255 |
| 5,020,768 | 6/1991 | Hardt et al. | 248/678 |
| 5,208,722 | 5/1993 | Ryan et al. | 360/99.01 |
| 5,232,303 | 8/1993 | Rubner | 403/330 |
| 5,263,668 | 11/1993 | Reiter | 248/346 |

FOREIGN PATENT DOCUMENTS 189405  11/1922  United Kingdom .............. 220/629

Primary Examiner—Leslie A. Braun
Assistant Examiner—Catherine S. Collins
Attorney, Agent, or Firm—Konneker Bush Hitt & Chwang

[57] ABSTRACT

A vertically elongated computer system tower unit has an internal sheet metal chassis portion having a bottom base wall to the underside of which four specially designed molded plastic stabilizing foot members are directly connected without the use of mounting screws or other separate mounting structures. Each support foot has a pair of top side retaining projections that are received in complementarily configured openings in the chassis base wall in a manner holding the foot member on the base wall and permitting the foot member to pivot between an initial installation position in which the projections may be inserted into or removed through the wall openings with the foot member underlying the base wall, a retracted position in which the foot member is pivoted outwardly from the installation position and underlies the base wall, and an extended position in which the foot member projects outwardly beyond the base wall and stabilizes the tower unit. A latch portion snaps into a base wall opening when the foot member is outwardly pivoted to its extended position to releasably lock the foot member in the extended position, and also snaps into another base wall opening to releasably prevent the foot member from being inwardly pivoted from its retracted position to its initial installation position.

15 Claims, 2 Drawing Sheets

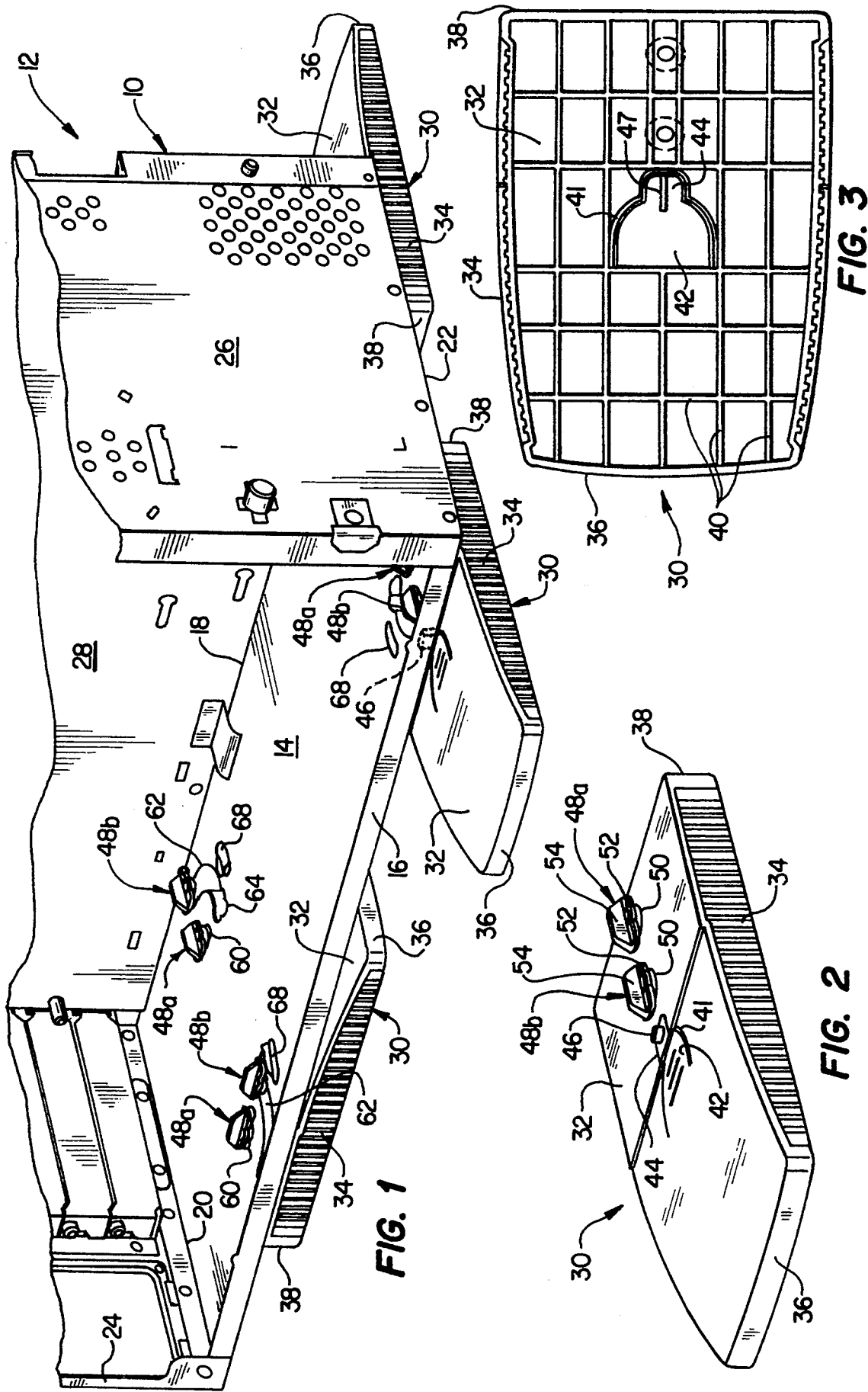

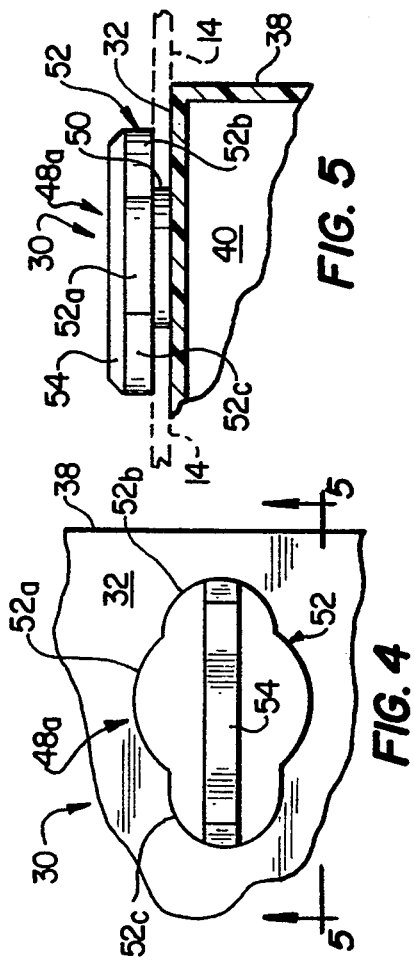
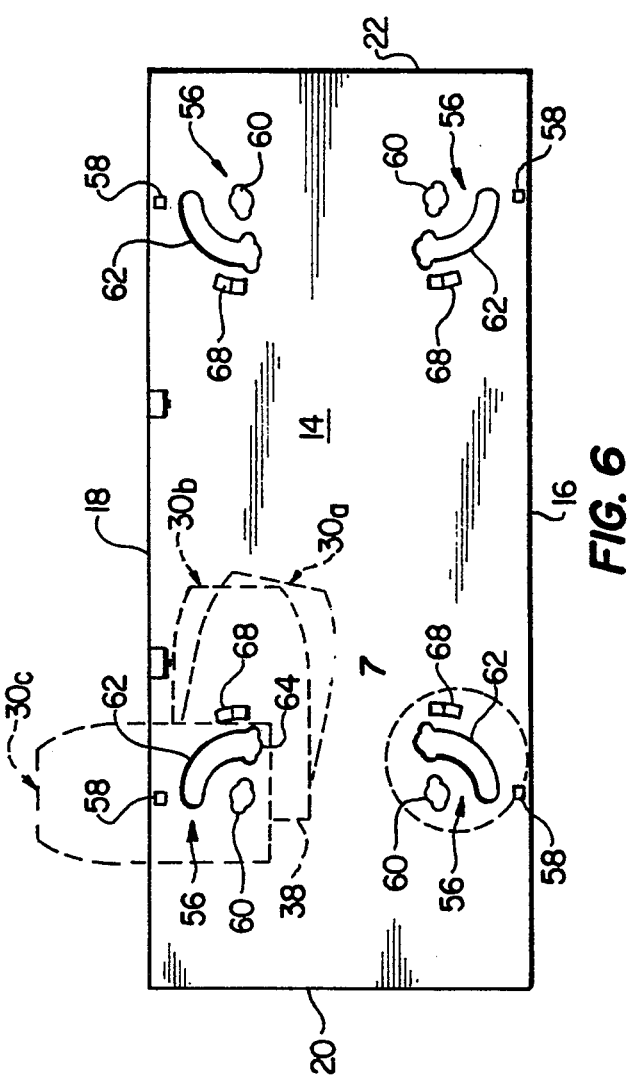
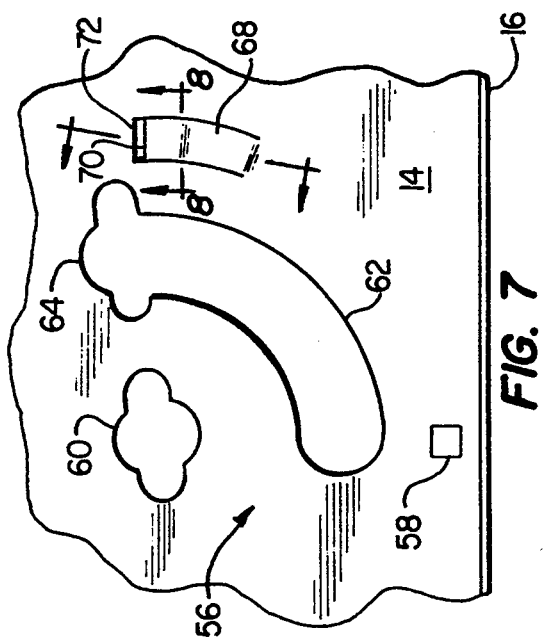
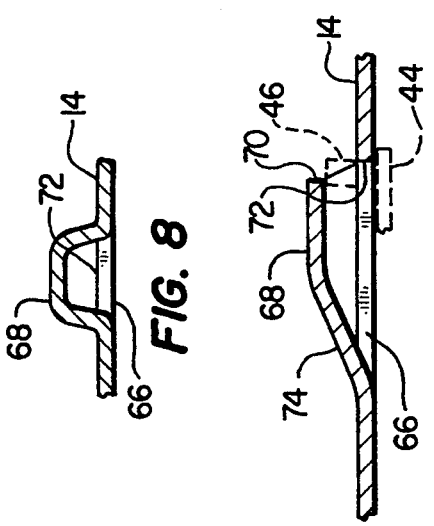

PIVOTABLE COMPUTER TOWER SUPPORT FOOT APPARATUS

BACKGROUND OF THE INVENTION

1. Field of the Invention

The present invention generally relates to support foot apparatus, and more particularly relates to support foot apparatus connected to the base portion of a tower type computer unit for stabilization purposes.

2. Description of Related Art

The housings of computer system tower units are vertically elongated and are designed to be stood on end on the floor adjacent a desk atop which the other two primary personal computer system components, a keyboard and a display monitor, are disposed. Because the tower unit is vertically elongated its center of gravity is relatively high. Accordingly, unless stabilized at its base in some manner the tower has a tendency to be easily tipped over if inadvertently bumped or jarred.

In order to stabilize a computer tower unit of this type various forms of support foot structures have been previously proposed for connection to and projection outwardly from the base of the tower unit. One such stabilizing foot structure comprises a plurality of elongated support foot members that are screwed to the bottom of the tower unit. When the tower is manufactured and shipped, the foot members are screwed to the bottom of the tower unit in retracted positions in which they are within the footprint of the tower base wall.

When the tower unit is unpacked and readied for use, the leg members are unscrewed from the tower base wall, reoriented to extended positions in which they longitudinally extend outwardly beyond the tower base wall, and then screwed back onto the underside of the base wall. This screw mounting of the support feet undesirably increases both the material and labor cost of the tower stabilizing structure, and does not provide for particularly convenient use by the ultimate owner of the tower unit.

Another prior art approach to using outwardly projecting support foot structures to stabilize a computer tower unit is illustrated and described in U.S. Pat. No. 5,020,768 to Hardt et al in which a plurality of foot structures are mounted on the underside of a computer tower unit for translational extension and retraction relative thereto. The mounting of these support is achieved using a relatively complicated multi-component foot guide and locking structure secured to the underside of the tower unit. While this overall stabilization structure is, from a functional standpoint, well suited for its intended purpose, it is relatively expensive from both a material and fabrication cost.

It can be seen from the foregoing that it would be desirable to provide improved computer tower stabilizing foot apparatus which eliminates, or at least substantially reduces, the above-mentioned problems, limitations and disadvantages typically associated with conventional stabilizing foot apparatus of the type generally described above. It is accordingly an object of the present invention to provide such improved computer tower unit stabilizing foot apparatus.

SUMMARY OF THE INVENTION

In carrying out principles of the present invention, in accordance with a preferred embodiment thereof, specially designed support foot apparatus is provided for stabilizing a vertically elongated computer system tower unit having a bottom base wall portion with an outer edge periphery.

The support foot apparatus comprises at least one stabilizing foot member disposed beneath the tower unit base wall which is representatively defined by the bottom end wall of an internal sheet metal chassis portion of the tower unit. Representatively, four support foot members are used, with two foot members being disposed along one side edge of the base wall, and the other two foot members being disposed along an opposite side edge of the base wall. Each foot member is preferably of a one piece molded plastic construction, has a body portion with a top side wall, and is directly connected to the tower unit base wall, without the use of mounting screws or other support structure, by cooperating opening means formed in the base wall and retaining means formed on the top body portion side wall of the foot member.

The retaining means project upwardly from the body portion top side wall, and through the base wall opening means, and releasably secure the foot member to the underside of the base wall for pivotal movement relative thereto to a selectively variable one of three positions—an initial installation position, a retracted position, and an extended tower stabilizing position.

In its extended position the foot member projects outwardly beyond the edge periphery of the tower unit base wall to stabilize the vertically elongated tower unit against tipping. In its retracted position the foot member is inwardly pivoted from its extended position to within the vertical footprint of the tower unit base wall. In its initial installation position the foot member is inwardly pivoted beyond its retracted position. The retaining means are downwardly withdrawable through the base wall opening means, to release the foot member from the base wall, when the foot member is in this initial installation position.

Latch means are associated with the foot member top side wall and are cooperable with the base wall opening means to (1) releasably lock the foot member in its extended position in response to pivotal movement of the foot member thereto from its retracted position, and (2) releasably block pivotal movement of the foot member from its retracted position to its initial installation position.

Each support foot member may be quickly and easily attached to the underside of the tower unit base wall by simply positioning the foot member beneath the base wall with the foot member being in its initial installation orientation, and the retaining means portion of the foot member appropriately aligned with a first portion of the base wall opening means. The retaining means are then moved upwardly through the first opening means portion and the foot member is outwardly pivoted to its retracted position.

Such outward pivoting of the foot member causes the retaining means to hold the foot member on the base wall, and also causes the latch means to snap upwardly into a second portion of the base wall opening means. This, in turn, causes the latch means to releasably block the return of the foot member to its initial installation position, thereby preventing undesired separation of the foot member from the tower unit base wall.

Subsequent outward pivoting of the foot member to its extended position causes the latch means to be downwardly withdrawn from the second portion of the base wall opening means and then snap upwardly into a third portion of the opening means to thereby releasably lock the foot member in its tower-stabilizing extended position. By manually depressing its latch means the foot member may be inwardly pivoted back to its retracted position in which the latch means snap upwardly into the second opening means portion to again releasably prevent the foot member from being inwardly pivoted to its initial installation position.

The latch means may be manually depressed again to withdraw them from the second opening means portion and permit the foot member to be inwardly pivoted to its initial installation position. When the foot member reaches its initial installation its retaining means may be downwardly withdrawn from the first opening means portion to free the foot member from the tower unit base wall.

BRIEF DESCRIPTION OF THE DRAWINGS

FIG. 1 is a perspective view of a lower end portion of the interior sheet metal chassis portion of a representative computer system tower unit incorporating therein pivotable support foot members embodying principles of the present invention;

FIG. 2 is an enlarged scale perspective view of one of the support foot members removed from the base wall of the chassis;

FIG. 3 is an enlarged scale bottom plan view of the support foot member;

FIG. 4 is an enlarged scale top plan view of an inner end portion of the support foot member;

FIG. 5 is a partial cross-sectional view taken through the support foot member along line 5—5 of FIG. 4;

FIG. 6 is a reduced scale top plan view of the base wall of the chassis;

FIG. 7 is an enlargement of the circled area "7" in FIG. 6;

FIG. 7 is an enlarged scale partial cross-sectional view through the chassis base wall taken along line 8—8 of FIG. 7; and FIG. 9 is an enlarged scale partial cross-sectional view through the chassis base wall taken along line 9—9 of FIG. 7.

DETAILED DESCRIPTION

Perspectively illustrated in FIG. 1 is a lower end portion of the sheet metal chassis section 10 of a vertically elongated, rectangularly cross-sectioned computer system tower unit 12. The outer jacket structure that normally covers the sides and top of the chassis has been removed for illustrative purposes. Chassis 10 has a rectangular base wall 14 with an opposed pair of elongated side edge portions 16,18 that extend between considerably shorter opposed side edge portions 20,22; vertical walls 24 and 26 respectively extending upwardly from edge portions 20 and 22; and a vertical wall 28 extending upwardly from edge portion 18.

Due to its vertical elongation the computer tower unit 12 is susceptible to being tipped over, about either of the elongated sides of the chassis base, if inadvertently bumped or jarred. To substantially inhibit the tower unit from being tipped over in this manner the present invention provides a simple and quite inexpensive stabilization system featuring four specially designed injection molded plastic support foot members 30, only three of which are visible in FIG. 1.

Referring now to FIGS. 2–5, each support foot 30 has an elongated, generally rectangular configuration; a top side wall 32 having a depending flange portion 34 around its periphery; an outer end 36; an inner end 38; and a latticed array of support ribs 40 depending from the top side wall 32 inwardly of the flange portion 34. As best illustrated in FIGS. 2 and 3 an outer end portion of the top side wall 32 tapers downwardly and horizontally inwardly toward the outer end 36.

An arcuate slot 41 formed in a central portion of the top side wall 32 defines thereon a latching tab portion 42 having a narrowed end portion 44 extending toward the inner end 38 of the support foot 30. The latching tab 42 is resiliently deflectable in a downward direction relative to the balance of the top side wall 32. A latching lug 46 projects upwardly from the top side of the latching tab end portion 44, and a pull tab 47 projects downwardly from the underside of the end portion 44.

Extending upwardly from the top side wall 32, between the tab end portion 44 and the inner end 38 of the support foot 30, are a pair of identical mounting projections 48a and 48b. As best illustrated in FIGS. 2, 4 and 5, each of these mounting projections has a generally cylindrical post portion 50 (see FIG. 5) extending upwardly from the top side wall 32 of the support foot member 30. A retaining flange 52 transversely extends across the top end of the post 50 and has a generally circular central portion 52a positioned directly over the post 50; an inner end 52b that horizontally extends laterally beyond the post 50 toward the inner foot member end 38 and is spaced upwardly apart from the top side wall 32; and an outer end 52c that horizontally extends laterally beyond the post 50 away from the inner foot member end 38 and is also spaced upwardly apart from the top side wall 32. For reasons subsequently discussed, the outer retaining flange end 52c is longer, in a direction parallel to the length of the support foot 30, than the inner retaining flange end 52b. A stiffening rib 54 is formed on the top side of the retaining flange 52.

Turning now to FIGS. 6 and 7, four spaced apart sets of opening means 56 are formed through the chassis base wall 14, two of the opening means sets being positioned adjacent the elongated base wall side edge 16, and the other two opening means sets being positioned adjacent the opposite elongated base wall side edge 18. As subsequently described herein, these opening means sets 56 are used to operatively and releasably mount the four support foot members 30 directly on the underside of the chassis base wall 14 without the necessity of mounting screws or other separate attachment structures.

Each opening means set 56, as best illustrated in FIG. 7, includes a rectangular latching opening 58 disposed adjacent one of the chassis base wall side edges 16 and 18; a mounting opening 60 configured to complementarily receive one of the foot member mounting projections 48a; an arcuate slot 62 configured to slidingly receive the post portion 50 of one of the foot member mounting projections 48b and an end portion 64 configured to complementarily receive the associated foot member mounting projection 48b; and an arcuate slot 66 (see FIGS. 8 and 9) disposed beneath an upwardly indented portion 68 of the chassis base wall 14. As illustrated, the indented portion 68 has an open end 70 that faces an end edge 72 of the arcuate slot 66.

The installation of one of the support leg members 30 on the underside of the chassis base wall 14 (representatively one of the support legs adjacent the elongated base wall side edge 18) is illustrated in FIG. 6. To removably attach the support leg member 30 to the chassis base wall 14 the support leg member is placed beneath the base wall 14 in the indicated initial installation position 30a. In such position 30a the inner end 38 of the support leg member 30 generally faces the short base wall edge portion 20, the length of the support leg member is inwardly inclined relative to the elongated base wall side edge portion 18 at an angle of approximately 10°, and the retaining flange portions 52 of the support foot member are aligned with the complementarily configured base wall opening 60 and the end portion 64 of the arcuate slot 62.

The retaining flanges 52 are then inserted upwardly through the opening 60 and the slot end portion 64. This upward insertion causes the latching lug 46 (see FIG. 2) to be pressed against the underside of the base wall 14, thereby downwardly deflecting the latching tab 42, and disposes the retaining flange end portions 52b and 52c above the top side of the chassis base wall 14 as shown in FIG. 5.

As previously mentioned, each of the retaining flange end portions 52c is longer than its associated end portion 52b, and the mounting opening 60 and slot end portion 64 have configurations complementary to those of the support foot member retaining flanges 52. Accordingly, none of the four support foot members 30 can be installed in an improper, longitudinally reversed orientation on the chassis base wall 14. Specifically, if any of the support foot members 30 is not properly oriented relative to its associated base wall opening means set 56 the retaining flanges 52 cannot be upwardly inserted through the base wall opening 60 and the slot end portion 64.

To complete the installation of the support foot member 30 after the retaining flanges 52 have been upwardly inserted through the mounting opening 60 and the slot end portion 64 (see FIG. 6), the support foot member 30 is simply pivoted from its installation position 30a approximately 10° toward the base wall side edge portion 18 to a retracted position 30b of the support foot member. In this retracted position 30b the installed support foot member 30 is disposed beneath and within the footprint of the chassis base wall 14, with the length of the support foot member extending parallel to the elongated chassis base wall side edge portion 18.

From its retracted position 30b the support foot member 30 may be outwardly pivoted to an extended position 30c in which the support foot member longitudinally extends transversely to and projects outwardly beyond the elongated chassis base wall side edge portion 18 to thereby stabilize the computer tower unit 12 and inhibit its tipping about the side edge portion 18.

As the support foot member 30 is outwardly pivoted from its retracted position 30b toward its extended position 30c, the latching lug 46 snaps upwardly through the arcuate base wall slot 66 into the interior of the upwardly indented base wall portion 68 as illustrated in FIG. 9. During further outward pivoting of the support foot member 30 toward its extended position 30c (i.e., in a leftward direction as viewed in FIG. 9) the latching lug 46 engages and is downwardly cammed by a sloping closed end portion 74 of the upwardly indented chassis base wall portion 68, thereby resiliently deflecting the latching tab 42 (see FIG. 2) in a downward direction.

The downwardly deflected latching lug 46 then engages and slides along the underside of the chassis base wall 14 until the support foot member 30 pivotally reaches its extended position 30c at which point the latching lug 46 reaches and snaps upwardly into the latch opening 58 as indicated in phantom in FIG. 1. The two support foot members 30 at the right end of the chassis 10 in FIG. 1 are shown in their extended positions, with the remaining visible support foot member being shown in its retracted position.

The upward entry of the latching lug 46 into its corresponding latch opening 58 releasably locks the support foot member in its extended position 30c. To return the support foot member to its retracted position 30b the latching tab 42 is manually depressed to remove the latching lug 46 from its associated latch opening 58, and the support foot member is then inwardly pivoted to its retracted position 30b. As the support foot member inwardly approaches its retracted position 30b the latching lug 46 upwardly enters the arcuate slot 66 as best illustrated in FIG. 9.

When the support foot member inwardly reaches its retracted position 30b, further inward pivoting of the support foot member to its initial installation position 30a is blocked by the engagement of the latching lug 46 with the slot end edge surface 72 as indicated in FIG. 9. This, in turn, prevents the foot member retaining flanges 52 from being brought into alignment with the mounting opening 60 and the slot end portion 64 (see FIG. 7) and falling downwardly therethrough. As will be appreciated, as long as the support foot member 30 is pivoted away from its initial installation position 30a, the flange end portions 52b and 52c overlie the top side of the chassis base wall 14 and retain the support foot member on the chassis base wall.

To permit the support foot member 30 to be inwardly pivoted from its retracted position 30b to its initial installation position 30a, thereby bringing the retaining flanges 52 back into alignment with and permitting their downward withdrawal through the mounting opening 60 and the slot end portion 64, the pull tab 47 (see FIG. 3) is downwardly pulled to downwardly deflect the latching tab 42 and remove the latching lug 46 (see FIG. 9) from the arcuate base wall slot 66. While the latching tab 42 is downwardly deflected in this manner the support foot member 30 is inwardly pivoted to its initial installation position 30a and removed from the chassis base wall 14 by pulling the retaining flanges 52 downwardly through the base wall opening 60 and the slot end portion 64.

As can be readily seen from the foregoing description, the support foot members 30 are directly attachable to the chassis base wall 14, are easily removable therefrom, and may be rapidly pivoted between their retracted and extended stabilizing positions without the necessity of using separate attachment structures (such as mounting screws) or auxiliary mounting apparatus of any sort. The identically configured support foot members are completely interchangeable with one another, are of an inexpensive yet quite rugged construction, and cannot be attached to the chassis base wall in an incorrect orientation relative thereto.

As can be seen in FIG. 1, each of the support foot members 30 may be independently positioned in either of its retracted and extended positions. Accordingly, if the computer tower unit 12 is to be positioned with one of its elongated sides in close proximity to an object such as a wall, the support foot members on that side of the tower unit may be conveniently retracted while the support foot members on the other side of the tower unit remain in their extended stabilizing positions.

The foregoing detailed description is to be clearly understood as being given by way of illustration and example only, the spirit and scope of the present invention being limited solely by the appended claims.

What is claimed is:

1. A vertically elongated computer system tower unit comprising:
    a generally horizontally positionable rectangular bottom base wall having an outer edge periphery and a footprint;
    opening means formed in said base wall; and
    at least one stabilizing foot member disposed beneath said base wall, each foot member having:
        a body portion with a top side wall,
        retaining means projecting upwardly from said body portion top side wall and through said opening means, said retaining means releasably securing said body portion to said base wall for pivotal movement relative thereto to a selectively variable one of (1) an extended position in which said foot member projects outwardly beyond said edge periphery of said base wall, (2) a retracted position in which said foot member is inwardly pivoted from said extended position to within the footprint of said base wall, and (3) an initial installation position in which said foot member is inwardly pivoted beyond said retracted position, said retaining means being downwardly withdrawable through said opening means, to release said foot member from said base wall, when said foot member is in said initial installation position thereof; and
        latch means associated with said body portion top side wall and cooperable with said opening means to (1) releasably lock said foot member in said extended position in response to pivotal movement of said foot member from said retracted position to said extended position, and (2) releasably block pivotal movement of said foot member from said retracted position to said initial installation position.

2. The computer system tower unit of claim 1 wherein:
    said computer system tower unit has an internal sheet metal chassis structure having a lower end wall which defines said bottom base wall of said computer system tower unit.

3. The computer system tower unit of claim 2 wherein:
    each stabilizing foot member is secured directly to said lower end wall of said chassis structure by said retaining means.

4. The computer system tower unit of claim 1 wherein:
    said rectangular bottom base wall has a pair of relatively long opposed side edge portions and a pair of relatively short opposed side edge portions,
    said opening means include two spaced sets of openings formed in said base wall adjacent one of said relatively long side edge portions, and two spaced sets of openings formed in said bottom base wall adjacent the other one of said relatively long side edge portions,
    said at least one stabilizing foot member comprises four stabilizing foot members each positioned at a different one of said opening sets, and
    each of said stabilizing foot members, when in said extended position thereof, horizontally projects outwardly beyond one of said relatively long side edge portions of said bottom base wall.

5. The computer system tower unit of claim 1 wherein:
    each stabilizing foot member is of a one piece injection molded plastic construction.

6. The computer system tower unit of claim 1 wherein said retaining means include:
    a spaced duality of retaining projections formed on said top side of said foot member body portion, each projection having a transverse upper end portion overlying said top side in an upwardly spaced, facing relationship therewith.

7. The computer system tower unit of claim 6 wherein:
    each of said retaining projections includes a post portion projecting upwardly from said top side of said foot member body portion, and each transverse upper end portion includes a retaining flange having a first end portion extending laterally outwardly a first distance beyond said post portion, and a second, oppositely directed end portion extending laterally outwardly beyond said post portion a second distance greater than said first distance.

8. The computer system tower unit of claim 7 wherein said opening means include:
    a first opening formed in said base wall and configured to complementarily and releasably receive the retaining flange of one of said retaining projections when said foot member is in said initial installation position, and
    an arcuate slot formed in said base wall and having an end portion configured to complementarily and releasably receive the retaining flange of the other one of said retaining projections when said foot member is in said initial installation position.

9. The computer system tower unit of claim 1 wherein said latch means include:
    a downwardly and resiliently deflectable latch tab portion of said top side of said foot member body portion, said latch tab portion having an upwardly projecting lug portion on a top side portion thereof, said lug portion being receivable in a first portion of said opening means when said foot member is in said extended position, and receivable in a second portion of said opening means when said foot member is in said retracted position.

10. The computer system tower unit of claim 9 further comprising:
    a downwardly projecting pull tab formed on the underside of said latch tab portion.

11. The computer system tower unit of claim 1 wherein said opening means include:
    a first opening extending through said bottom base wall and configured to releasably receive a first portion of said retaining means,
    a first arcuate slot extending through said bottom base wall and having an end portion configured to releasably receive a second portion of said retaining means,
    a second opening extending through said bottom base wall and configured to releasably receive a portion of said latch means when said foot member is in said extended position, and
    a second arcuate slot extending through said bottom base wall and configured to releasably receive said portion of said latch means when said foot member is in said retracted position.

12. A stabilizing foot structure pivotally connectable to a bottom end wall portion of a computer system tower unit, said stabilizing foot structure being substantially smaller than said bottom end wall and comprising:
- a body portion having a top side wall, an outer end, and an inner end;
- a slot formed in a generally central portion of said top side wall and defining on said top side wall a downwardly and resiliently deflectable latch tab;
- a latching lug formed on and projecting upwardly from said latch tab;
- a first retaining projection formed on and projecting upwardly from said top side wall between said latch tab and said inner end of said body portion, said first retaining projection having a post portion projecting upwardly from said top side wall and horizontally enlarged upper end portion that extends over said top side wall in an upwardly spaced, generally parallel relationship therewith and
- a second retaining projection formed on and projecting upwardly from said top side wall between said first retaining projection and said latch tab, said second retaining projection having a post portion projecting upwardly from said top side wall and horizontally enlarged upper end portion that extends over said top side wall in an upwardly spaced, generally parallel relationship therewith; and wherein each of said horizontally enlarged upper end portions of said first and second retaining projections includes a retaining flange having a first end portion extending in a first direction through a first length over said top side wall and a second end portion extending in an opposite direction through a second length over said top side wall.

13. The stabilizing foot structure of claim 12 further comprising:
- a downwardly projecting pull tab formed on the underside of said latch tab.

14. The stabilizing foot structure of claim 12 wherein: said stabilizing foot structure is of a one piece injection molded plastic construction.

15. The stabilizing foot structure of claim 12 wherein: said first length is greater than said second length.

* * * * *